US012608256B2

(12) United States Patent
Baek

(10) Patent No.: US 12,608,256 B2
(45) Date of Patent: Apr. 21, 2026

(54) NEURAL CONSENSUS BODY-BASED BLOCKCHAIN NETWORK SYSTEM FOR PERFORMING RANDOM CONSENSUS BODY PROOF USING NON-RANDOM CONSENSUS BODY PROOF-BASED BLOCKCHAIN NETWORK, FOR GUARANTEEING SERVICE CONTINUITY WHEN FAILURE OF NETWORK OCCURS

(71) Applicant: LEADPOINT SYSTEM INC., Jeonju-si (KR)

(72) Inventor: Eun Ju Baek, Daejeon (KR)

(73) Assignee: LEADPOINT SYSTEM INC., Jeonju-si (KR)

( * ) Notice: Subject to any disclaimer, the term of this patent is extended or adjusted under 35 U.S.C. 154(b) by 94 days.

(21) Appl. No.: 18/688,745

(22) PCT Filed: Sep. 2, 2022

(86) PCT No.: PCT/KR2022/013169
§ 371 (c)(1),
(2) Date: Mar. 1, 2024

(87) PCT Pub. No.: WO2023/033580
PCT Pub. Date: Mar. 9, 2023

(65) Prior Publication Data
US 2024/0394131 A1 Nov. 28, 2024

(30) Foreign Application Priority Data
Sep. 2, 2021 (KR) ........................ 10-2021-0116827

(51) Int. Cl.
*G06F 11/07* (2006.01)
*H04L 9/00* (2022.01)
*H04L 9/32* (2006.01)

(52) U.S. Cl.
CPC ........ *G06F 11/0709* (2013.01); *H04L 9/3247* (2013.01); *H04L 9/50* (2022.05); *H04L 2209/56* (2013.01)

(58) Field of Classification Search
None
See application file for complete search history.

(56) References Cited

U.S. PATENT DOCUMENTS 8,656,226 B1 * 2/2014 Havemose ............ G06F 11/079
714/47.1
11,343,073 B2 * 5/2022 Oh ........................ H04L 63/123
(Continued)

FOREIGN PATENT DOCUMENTS

KR 10-2019-0122149 A 10/2019
KR 10-2019-0133687 A 12/2019
(Continued)

OTHER PUBLICATIONS

"Blockchain Technology", by Priyanka Ray, Principal Consultant, Ericsson, India. Fundamentals of Network Planning and Optimisation 2G/3G/4G: Evolution to 5G, Second Edition. Ajay R. Mishra. © 2018 John Wiley & Sons Ltd. Published 2018 by John Wiley & Sons Ltd. (Year: 2018).*
(Continued)

*Primary Examiner* — Hasanul Mobin
(74) *Attorney, Agent, or Firm* — Harvest IP Law, LLP

(57) ABSTRACT

An operation method of a node device connected to a non-random consensus body proof-based blockchain network according to an embodiment of the present disclosure comprises acquiring new block data propagated through the blockchain network; and performing a neural consensus body proof-based block generation process corresponding to the new block data according to a preset condition, wherein the neural consensus body proof-based block generation process includes extracting validity verification data from
(Continued)

1000 the new block data; acquiring neural consensus body designation information of a next block generated on the basis of a random consensus body proof process according to a verification process of the validity verification data; and generating validity verification data of the next block by selectively driving a consensus body node function unit on the basis of the neural consensus body designation information of the next block.

11 Claims, 10 Drawing Sheets

(56)     References Cited

U.S. PATENT DOCUMENTS

| | | | |
|---|---|---|---|
| 2009/0313500 A1* | 12/2009 | Butterworth | G06F 11/1438 |
| | | | 714/11 |
| 2010/0080117 A1* | 4/2010 | Coronado | G06F 11/076 |
| | | | 370/217 |
| 2014/0189039 A1* | 7/2014 | Dalton | G06F 11/3006 |
| | | | 709/213 |
| 2019/0012595 A1* | 1/2019 | Beser | G06N 3/08 |
| 2019/0058580 A1* | 2/2019 | Tormasov | H04L 9/3239 |
| 2019/0251199 A1* | 8/2019 | Klianev | G06Q 40/04 |
| 2020/0320490 A1* | 10/2020 | Yeap | H04L 9/50 |
| 2020/0364709 A1* | 11/2020 | Newman | G06Q 20/3829 |
| 2020/0380825 A1* | 12/2020 | Purohit | G07F 17/3251 |
| 2020/0380826 A1* | 12/2020 | Taylor | H04L 9/3297 |
| 2020/0403776 A1* | 12/2020 | Oh | H04L 9/3247 |
| 2021/0099311 A1* | 4/2021 | Saponaro | H04L 9/3297 |
| 2021/0303553 A1* | 9/2021 | Zanpure | G06F 16/2365 |
| 2022/0035693 A1* | 2/2022 | Jiang | G06F 11/079 |
| 2025/0240167 A1* | 7/2025 | Kim | H04L 9/50 |

FOREIGN PATENT DOCUMENTS

| | | |
|---|---|---|
| KR | 10-2020-0144466 A | 12/2020 |
| KR | 10-2021-0066348 A | 6/2021 |

OTHER PUBLICATIONS

International Search Report & Written Opinion for PCT/KR2022/013169 by Korean Intellectual Property Office dated Jan. 3, 2023.

Office Action for KR 10-2021-0116827 by Korean Intellectual Property Office dated Jun. 5, 2023.

Kang, Yong-Hyeog et al. (2020). "A Study on Concurrency Control Scheme for Scalability of Blockchain", Convergence Security Journal, 20(3), 71-78. doi:10.33778/kcsa.2020.20.3.071.

* cited by examiner

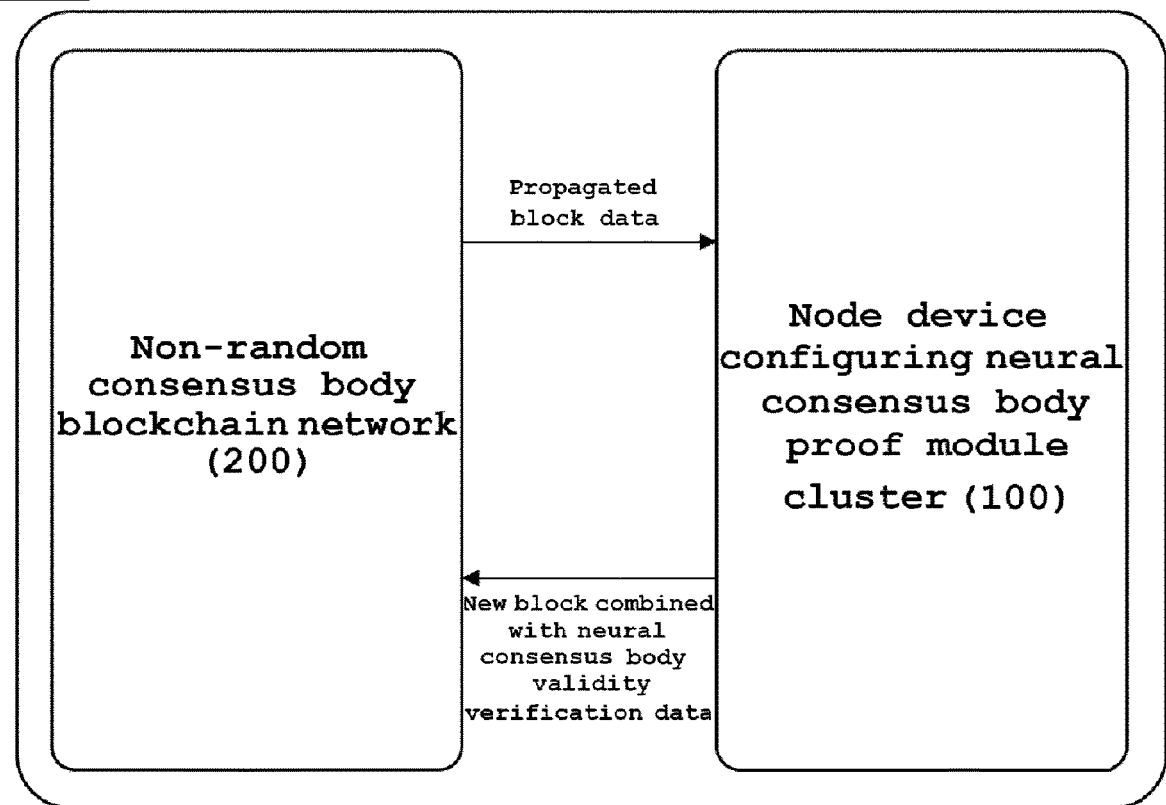

Propagated
block data

Non-random
consensus body
blockchain network
(200)

Node device
configuring neural
consensus body
proof module
cluster (100)

New block combined
with neural
consensus body
validity
verification data

Construct non-competitive decentralized new blockchain network based on neural consensus body proof using non-random consensus body blockchain network previously constructed in PoS or PoW method

FIG. 5

Acquire new block data propagated through previously constructed blockchain network — S101

Extract validity verification data from new block data — S103

Acquire consensus designation information according to verification process of validity verification data — S105

Is node selected as node constituting consensus body node? — S107
N → (loop back)
Y ↓

Confirm whether it is chairman node on the basis of consensus designation information — S109

Is it designated as chairman node? — S111
Y →
N ↓

Transmit delegation information and participation qualification verification information of valid transaction block taken from transaction pool of blockchain network to congress chairman node — S113

Collect delegation information and next block consensus body candidate information from other nodes — S115

Transmits message requesting to perform partial signature process on multi-signature area indicating consensus on candidate transaction block to committee member node — S117

Verify candidate block for which multi-signature process is completed according to consensus of committee, and determine as distribution block — S119

Generate new block by generating and combining validity verification data with distribution block — S121

Register combined new block in transaction pool, and propagate through previously constructed blockchain network — S123

[Delegation request step]

[Preparation step]

[Committee verification step]

[Agreed new block propagation step]

FIG. 10

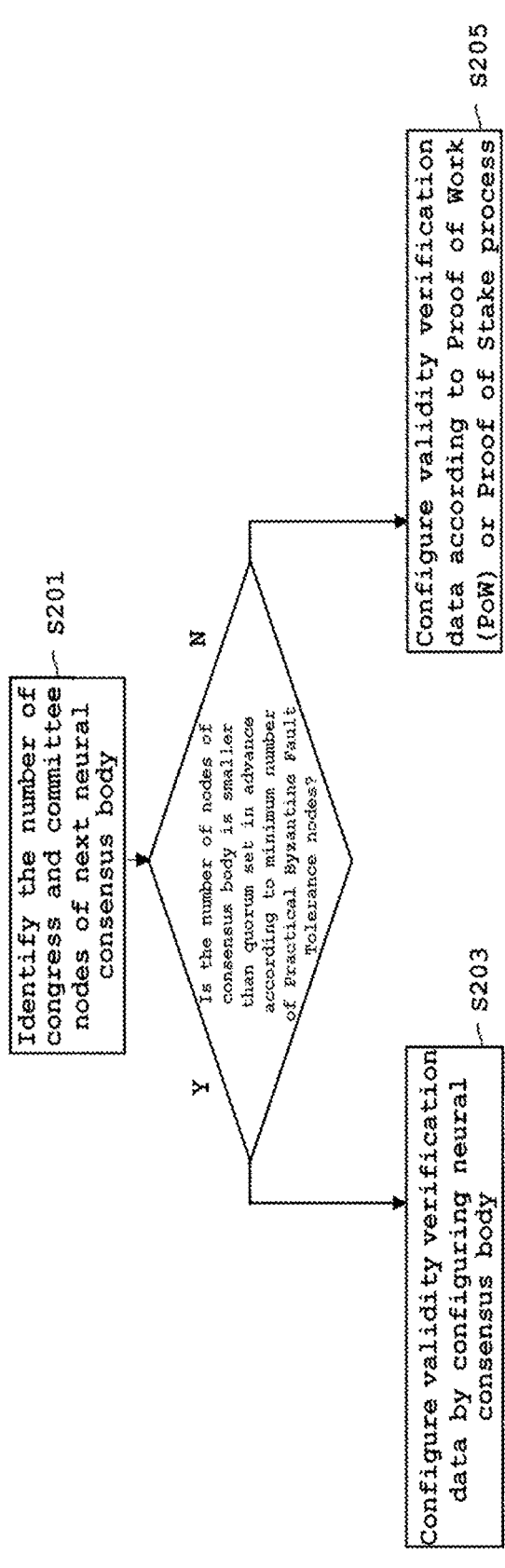

Identify the number of congress and committee nodes of next neural consensus body — S201

Is the number of nodes of consensus body is smaller than quorum set in advance according to minimum number of Practical Byzantine Fault Tolerance nodes?

Y — Configure validity verification data by configuring neural consensus body — S203

N — Configure validity verification data according to Proof of Work (PoW) or Proof of Stake process — S205

NEURAL CONSENSUS BODY-BASED BLOCKCHAIN NETWORK SYSTEM FOR PERFORMING RANDOM CONSENSUS BODY PROOF USING NON-RANDOM CONSENSUS BODY PROOF-BASED BLOCKCHAIN NETWORK, FOR GUARANTEEING SERVICE CONTINUITY WHEN FAILURE OF NETWORK OCCURS

CROSS-REFERENCE TO RELATED APPLICATIONS

This application is a National Phase Entry Application of PCT Application No. PCT/KR2022/013169, filed on Sep. 2, 2022, which claims priority to Korean Patent Application No. 10-2021-0116827, filed on Sep. 2, 2021, in Korean Intellectual Property Office, the entire contents of which are hereby incorporated by reference in its entirety.

TECHNICAL FIELD

The present disclosure relates to a device for constructing a blockchain network and an operation method thereof. More specifically, the present disclosure relates to a neural consensus body-based blockchain network system for performing a random consensus body proof using a non-random consensus body proof-based blockchain network, in which service continuity is guaranteed when a failure of network occurs.

BACKGROUND ART

Generally, blockchain is a distributed database and utilizes a P2P (Peer to Peer) network. The distributed database is a technique that physically distributes data so that a plurality of users may share a large database. The blockchain is a structure list that stores data, and node terminals participating in the network may jointly record and manage ledger data that stores data and records transaction information through verification.

As an example of blockchain utilization, blockchain can be created as node terminals of virtual currency users connected through the Internet configure a P2P network. Through this, blocks containing virtual currency transaction details may be managed by user node terminals and propagated in connection with new blocks. When a new block is generated, the block may be verified through a consensus algorithm of a plurality of participants (node terminals) and connected to existing blocks, and a final ledger containing transaction details is confirmed and stored in a distributed manner. In addition, when a transaction occurs at a participating node terminal, transaction information verified through validity verification of the transaction is propagated to each node terminal. Through this, transaction details, i.e., verified transactions, are propagated and stored in a distributed manner, and when data stored in some nodes is falsified, authenticity of the data can be grasped based on the transactions stored in a distributed manner. Security stability of the blockchain increases as the users sharing the data increase. The blockchain is used in various online services such as cloud computing services or the like, in addition to Bitcoin.

Blockchain techniques may reduce transaction costs and prevent forgery and falsification of data by changing existing centralized data management structures to decentralized or distributed structures. The blockchain techniques may create economic value in combination with industries in the fields of finance, medical, contents, public sector, logistics, distribution, energy, and the like.

The blockchain allows nodes participating in the network to generate blocks and propagate information on the generated blocks to other nodes. In addition, nodes receiving new block information may determine and verify consistency of the new block information. At this point, validity verification of the transaction details, i.e., transactions, that can be included in the newly generated blocks may also be performed by the nodes participating in the blockchain network.

In addition, a consensus algorithm may be applied to the blockchain network to guarantee integrity and review legitimacy of the block information that configures the ledger managed by the participating nodes. Consensus algorithms such as Proof of Work (PoW), Proof of Stake (POS), Delegated Proof of Stake (DPOS), Practical Byzantine Fault Tolerance (PBFT), and the like are generally applied.

The Proof of Work (PoW) is a method of suppressing fraud by proving that resources (e.g., computing power or the like) are invested for works, and participating nodes should invest resources to participate in the Proof of Work (PoW). Spam or DOS attacks may be successful only when more than 51% of resources are invested.

POW requires a unique hash value to generate a block, and here, since the unique hash value is a value that should be found by randomly assigning a nonce value, resources such as computing power or the like should be excessively invested to find the unique hash value, cost and environmental problems may arise due to power consumption, and separate chips having concentrated functions appear, and therefore, centralization problems due to unification of computing power may arise.

To solve this problem, Proof of Stake (POS) has been proposed, and PoS adopts a method that can make proof in proportion to the stake of nodes. PoS makes the probability of generating blocks be proportional to the stake of tokens that each node has. When POS is considered as a resource that invests the stake of tokens, it may be regarded as a specific type of PoW. The algorithmic formula of PoS may be expressed as 'POW using digest'. Compared with POW, POS consumes little energy and makes resource concentration difficult.

However, since POS is a method that is more advantageous as the stake increases, a problem of centralizing generation of blocks may occur due to the stake, and each node may show a tendency of only collecting and not using tokens. Furthermore, since the stake reaches 100% at the genesis block starting point corresponding to the first block of the blockchain, a person who has started the system may regenerate the entire block any number of times. Since it is possible to start over from that start point as long as each node has a stake, PoS alone may not prevent forgery and falsification.

To solve this problem, Korea Patent Publication No. 10-2019-0122149 discloses a method of selecting a consensus node using a nonce. This method is advantageous in that since a fair random consensus body is used, it does not no need to use resources like PoW excessively, and only some nodes selected from the entire nodes as a consensus body according to the nonce chain may participate in generation of blocks in order to minimize resource consumption to improve the disadvantage of monopolizing the right to update by nodes having many resources like POS, and nodes that will acquire the right to generate blocks may not be predicted in advance through a nonce proof process, and a predetermined number of consensus nodes, which are representatives of probabilistic entire, are selected.

Nevertheless, since blockchain networks that have already been established around the world, such as Bitcoin and Ethereum, still use a PoW or PoW method, and private blockchain networks operate networks in which only small-scale nodes may participate, such as PBFT, in order to preserve efficiency of communication amounts, although a new network is constructed by proposing a new consensus technique, it is very difficult to quickly overcome waste of resources and social costs generated by the existing blockchain networks that have already been constructed in a large scale.

Furthermore, in the case of the blockchain network, when a defect or a failure of the network itself occurs, the block generation process itself may be interrupted, this may cause transaction failures and generate delays of transactions.

DISCLOSURE OF INVENTION

Technical Problem

The present disclosure has been made in view of the above problems, and it is an object of the present disclosure to provide a device and an operation method thereof, and a new blockchain network system based thereon, which support operation of a random consensus body proof-based blockchain network based on a previously constructed blockchain network, while controlling the previously constructed blockchain network of an existing PoW or PoS method not to operate in the PoW or PoS method any longer, by constructing a neural consensus body proof module cluster that uses an existing non-random consensus body proof-based blockchain network as the random consensus body proof-based blockchain network.

Furthermore, another object of the present disclosure is to provide a blockchain network system, which can drive a continuity guarantee mode that may be configured to subsidiarily operate using a random consensus body proof-based blockchain network only when a failure condition occurs so that service continuity can be maintained when a failure occurs in the current non-random consensus body proof-based blockchain network, and the blockchain network system may also be used to guarantee continuity of existing services.

Technical Solution

To accomplish the above objects, according to one aspect of the present disclosure, there is provided an operation method of a node device connected to a non-random consensus body proof-based blockchain network, the method comprising the steps of: acquiring new block data propagated through the blockchain network; and performing a neural consensus body proof-based block generation process corresponding to the new block data according to a preset condition, wherein the neural consensus body proof-based block generation process includes the steps of: extracting validity verification data from the new block data; acquiring neural consensus body designation information of a next block generated on the basis of a random consensus body proof process according to a verification process of the validity verification data; and generating validity verification data of the next block by selectively driving a consensus body node function unit on the basis of the neural consensus body designation information of the next block, wherein the validity verification data includes consensus process verification data corresponding to the random consensus body proof process, and the neural consensus body proof-based block generation process is performed only when a next block consensus failure condition of the non-random consensus body blockchain network occurs.

According to another aspect of the present disclosure, there is provided a node device connected to a non-random consensus body proof-based blockchain network to perform, when new block data propagated through the blockchain network is acquired, a neural consensus body proof-based block generation process corresponding to the new block data according to a preset condition, wherein the node device comprises: a validity verification processing unit for acquiring new block data propagated through the blockchain network, extracting validity verification data from the new block data, and acquiring neural consensus body designation information of a next block generated on the basis of a random consensus body proof process according to a verification process of the validity verification data, according to the neural consensus body proof-based block generation process; and a consensus body node function unit selectively driven on the basis of the neural consensus body designation information of the next block to generate validity verification data of the next block, according to the neural consensus body proof-based block generation process, wherein the validity verification data includes consensus process verification data corresponding to the random consensus body proof process, and the neural consensus body proof-based block generation process is performed only when a next block consensus failure condition of the non-random consensus body blockchain network occurs.

According to another aspect of the present disclosure, there is provided a blockchain network platform system comprising: a non-random consensus body proof-based blockchain network; and a neural consensus body proof module cluster for generating a new block combined with neural consensus body validity verification data based on random consensus body proof, using block data propagated from the non-random consensus body proof-based blockchain network according to a preset condition, wherein the new block is propagated through the non-random consensus body proof-based blockchain network, and the neural consensus body proof module cluster is configured of one or more node devices for acquiring the new block data propagated through the non-random consensus body proof-based blockchain network, extracting the validity verification data from the new block data, acquiring neural consensus body designation information of a next block generated on the basis of a random consensus body proof process according to a verification process of the validity verification data, generating validity verification data of the next block by selectively driving a consensus body node function unit on the basis of the neural consensus body designation information of the next block, configuring the next block that combines the generated validity verification data and the new block, and propagating the next block through the non-random consensus body proof-based blockchain network, wherein the validity verification data includes consensus process verification data corresponding to the random consensus body proof process, and the neural consensus body proof-based block generation process is performed only when a next block consensus failure condition of the non-random consensus body blockchain network occurs.

Advantageous Effects

According to an embodiment of the present disclosure, it is possible to provide a node terminal device that forms a network and an operation method thereof, which allow a random consensus body proof-based blockchain network based on a previously constructed blockchain network to operate, while controlling the previously constructed blockchain network of an existing PoW or PoS method not to operate in the PoW or PoS method any longer, or controlling to operate in a limited manner according to the minimum number of nodes of the Practical Byzantine Fault Tolerance consensus body, by constructing a neural consensus body proof module cluster that uses an existing non-random consensus body proof-based blockchain network as the random consensus body proof-based blockchain network.

Accordingly, as a previously constructed non-random consensus body proof-based blockchain network may be switched to be utilized as a random consensus body proof-based blockchain network while maintaining the infrastructure and utilization to the maximum, it is possible to provide a device for providing an efficient and fair neural consensus body proof-based distributed consensus process while preventing waste of resources and social costs, and an operation method thereof.

In addition, according to an embodiment of the present disclosure, a continuity guarantee mode that may be configured to subsidiarily operate using a random consensus body proof-based blockchain network only when a failure condition occurs can be driven so that service continuity can be maintained when a failure occurs in the current non-random consensus body proof-based blockchain network, and accordingly, the present disclosure may also be used to guarantee continuity of existing services.

BRIEF DESCRIPTION OF THE DRAWINGS

FIG. 2 is a view illustrating a blockchain network according to an embodiment of the present disclosure.

FIG. 5 is a flowchart illustrating the operation method of a node device according to an embodiment of the present disclosure.

FIG. 10 is a flowchart illustrating the operation method of a node device according to another embodiment of the present disclosure.

BEST MODE FOR CARRYING OUT THE INVENTION

Hereinafter, only the principles of the present disclosure will be exemplified. Therefore, although not clearly described or shown in this specification, those skilled in the art will be able to implement the principles of the present disclosure and invent various devices included in the spirit and scope of the present disclosure. In addition, it should be understood that all conditional terms and embodiments listed in this specification are, in principle, clearly intended only for the purpose of understanding the concept of present disclosure, and not limited to the embodiments and states specially listed as such.

In addition, it should be understood that all detailed descriptions listing specific embodiments, as well as the principles, aspects, and embodiments of the present disclosure, are intended to include structural and functional equivalents of such matters. In addition, it should be understood that such equivalents include equivalents that will be developed in the future, as well as currently known equivalents, i.e., all devices invented to perform the same function regardless of the structure.

Accordingly, for example, the block diagrams in the specification should be understood as expressing the conceptual viewpoints of exemplar circuits that embody the principles of the present disclosure. Similarly, all flowcharts, state transition diagrams, pseudo code, and the like may be practically embodied on computer-readable media, and it should be understood that regardless of whether or not a computer or a processor is explicitly shown, they show various processes performed by the computer or processor.

In addition, explicit use of the terms presented as a processor, control, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

The above objects, features, and advantages will become more apparent through the following detailed description related to the accompanying drawings, and accordingly, those skilled in the art may easily implement the technical spirit of the present disclosure. In addition, when it is determined in describing the present disclosure that the detailed description of a known technique related to the present disclosure may unnecessarily obscure the gist of the present disclosure, the detailed description will be omitted.

Hereinafter, a preferred embodiment according to the present disclosure will be described in detail with reference to the accompanying drawings.

Figure 1:
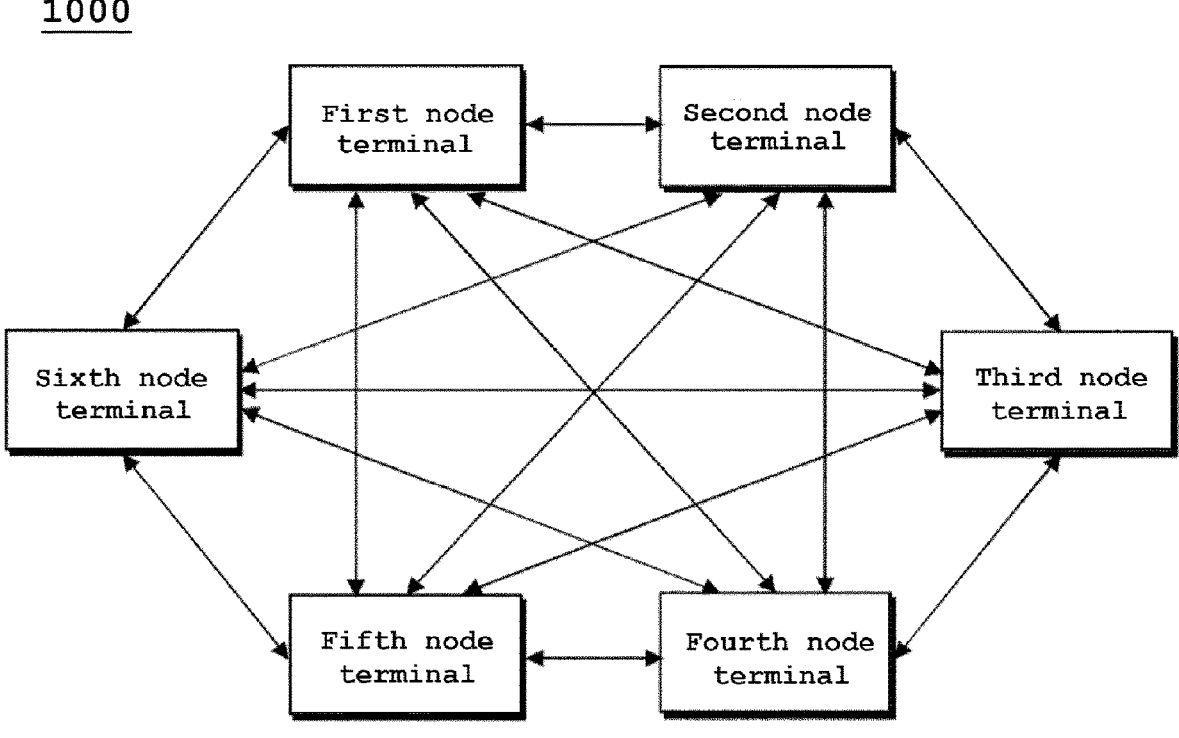
FIG. 1 is a view schematically showing the entire system according to an embodiment of the present disclosure.

FIG. 1 is a view schematically showing the entire system according to an embodiment of the present disclosure. FIG. 2 is a view illustrating a blockchain network according to an embodiment of the present disclosure.

First, referring to FIG. 1, the blockchain network system 1000 according to an embodiment of the present disclosure may configure a blockchain network of a mesh network topology by one or more node terminals connected through a wired or wireless network. The node terminals are connected to the blockchain network through an input/output device and may exchange data. The blockchain network system 1000 may include various electronic systems, such as mobile devices such as mobile phones, smart phones, PDAs, tablet computers, laptop computers or the like, computing devices such as personal computers, tablet computers, netbooks or the like, electronic products such as televisions, smart televisions, security device for gate control or the like, and the like, as the node terminals.

In addition, each of the node terminals 100 may be equipped with a communication module for accessing the blockchain network. The blockchain network may be implemented in a wired network, for example, a Local Area Network (LAN), a Wide Area Network (WAN), a Value-Added Network (VAN), or the like. In addition, the blockchain network may be implemented in all types of wireless networks such as mobile radio communication networks, satellite communication networks, Bluetooth, Wireless Broadband Internet (Wibro), High Speed Downlink Packet Access (HSDPA), Wi-Fi, Long Term Evolution (LTE), and the like. The blockchain network may be a network combining the wired and wireless networks as needed.

In addition, each node terminal may register account information according to its node access in the transaction ledger data shared in a cloud method through the network. In addition, when transaction of encryption information for generating a block chain is needed, each trader's terminal may propagate transaction information to be recorded in the transaction ledger data to each trader's terminal.

In addition, as the transaction ledger data is updated and information thereon is shared according to a mutual verification process corresponding thereto, transaction of encryption information for generating a block chain may be processed.

Here, as the current block contains a hash value for a previously generated block by the block corresponding to a predetermined time or unit, the transaction ledger data may be linked to blockchain data having a structure that sequentially connects a plurality of blocks in order of generation. Accordingly, verification of forgery and falsification of the transaction ledger data may be easily processed by verifying the hash value of the block chain.

Security stability of the blockchain may be formed by participation of sharers, who share data, in the system. Therefore, transaction information blocks containing details of sharing between sharer's terminals connected to the blockchain network and details of issuance/transaction of encryption information for generating the blockchain may be stored sequentially, and a transaction verification process for sequentially block-chaining the hash value for preventing forgery and falsification may be performed on each trader's terminal in a distributed manner.

In the transaction verification process, as shown in FIG. 2, a previously constructed blockchain network is generally a non-random consensus body proof-based blockchain network. Representatively, Proof of Work (PoW), Proof of Stake (POS), or the like may be a non-random consensus body proof-based blockchain network 200, and blockchain networks such as Bitcoin, Ethereum, and the like may correspond thereto.

In correspondence thereto, a node device 100 according to an embodiment of the present disclosure may configure a neural consensus body proof module cluster, and the neural consensus body proof module cluster may configure a new block combining neural consensus body validity verification data on the basis of a random consensus body proof method, and the configured new block may be processed to be propagated through the non-random consensus body blockchain network 200.

Accordingly, in the non-random consensus body blockchain network 200, block data propagated again is shared in the network, and it may be processed again to generate a next block by the node device 100 constituting the neural consensus body proof module cluster. Since a proof by PoW, PoS or the like is not separately required in this process, a new random consensus body blockchain network system 1000 capable of implementing decentralization in a non-competitive manner can be constructed.

That is, according to an embodiment of the present disclosure, it is possible to provide a node terminal device 100 that forms a network, which allows a random consensus body proof-based blockchain network based on a previously constructed blockchain network to operate, while controlling the previously constructed blockchain network of an existing PoW or PoS method not to operate in the PoW or PoS method any longer, or controlling to operate in a limited manner according to the minimum number of nodes of the Practical Byzantine Fault Tolerance consensus body, by constructing a neural consensus body proof module cluster, which allows to use an existing non-random consensus body proof-based blockchain network 200 as the random consensus body proof-based blockchain network 1000, using the node devices 100.

Accordingly, as a previously constructed non-random consensus body proof-based blockchain network may be switched to be utilized as a random consensus body proof-based blockchain network while maintaining the infrastructure and utilization to the maximum, it is possible to provide a device for providing an efficient and fair neural consensus body proof-based distributed consensus process while preventing waste of resources and social costs. Here, a nonce chain configured based on one-time random numbers and a hash confirmation process may be used to prove qualifications of participating in the random consensus body, but this is only an example, and designation of the random consensus body or proof of the participation qualifications may be possible in various other ways.

Figure 3:
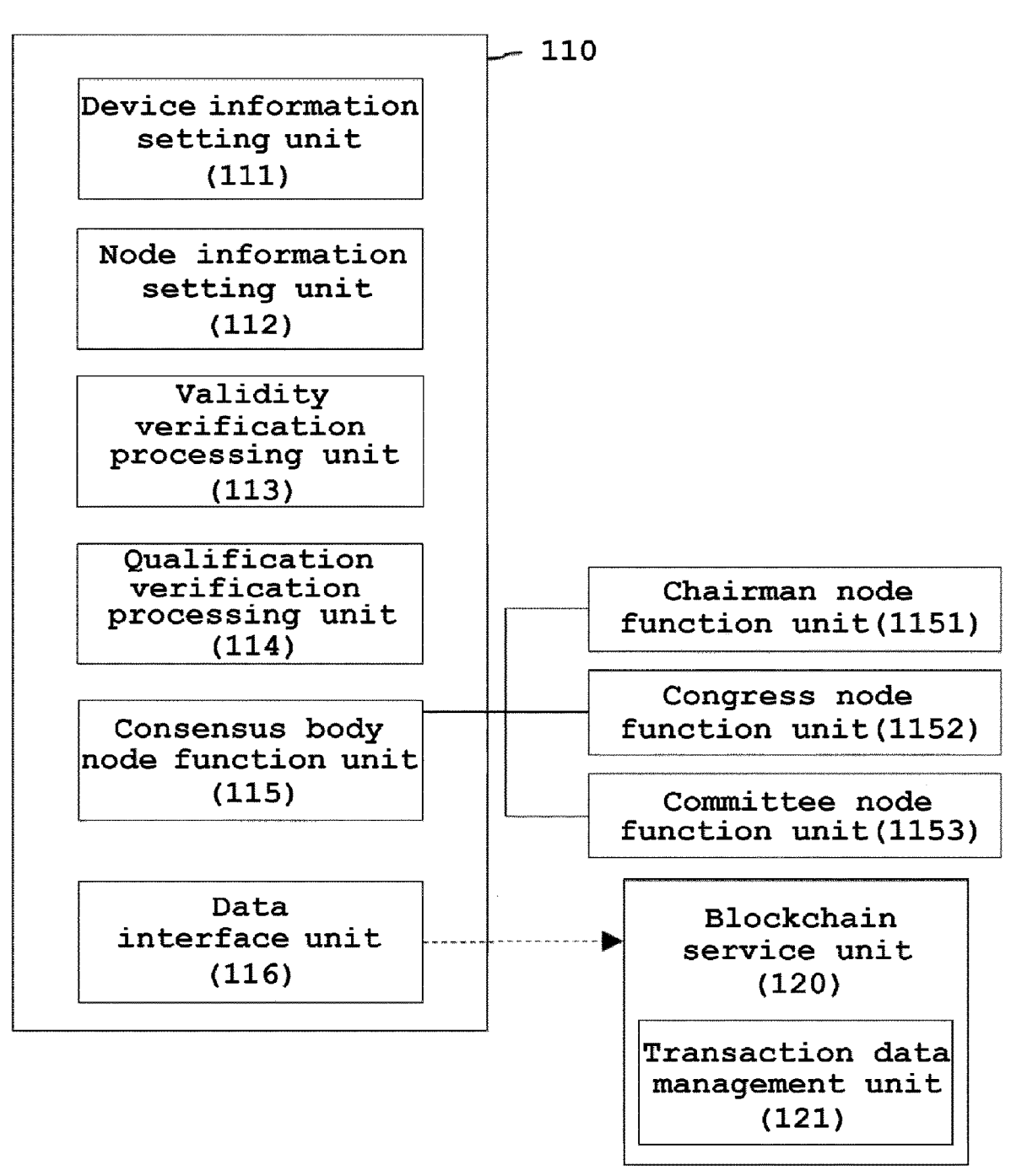
FIG. 3 is a block diagram showing a node device according to an embodiment of the present disclosure in more detail.
Figure 4:
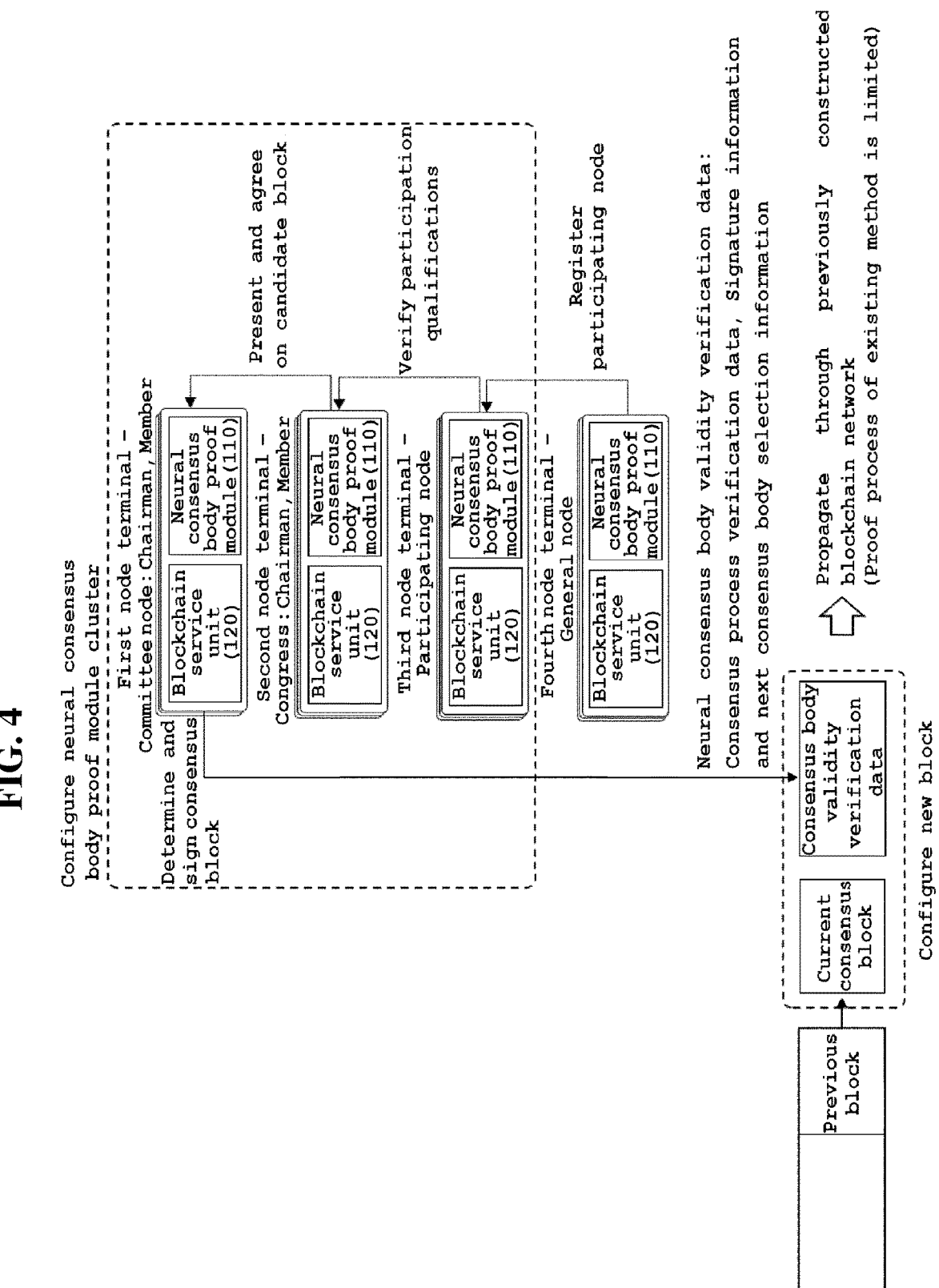
FIG. 4 is a conceptual view illustrating the configuration and overall process of a neural consensus body proof module cluster according to an embodiment of the present disclosure.

More specifically, referring to FIGS. 3 and 4, FIG. 3 is a block diagram showing a node device according to an embodiment of the present disclosure in more detail, and FIG. 4 is a conceptual view illustrating the configuration and overall process of a neural consensus body proof module cluster according to an embodiment of the present disclosure.

The node terminals 100 of the blockchain system 1000 according to an embodiment of the present disclosure may be included in a neural consensus body proof module cluster for configuring a next block by a random node selection process, and each may include a neural consensus body proof module 110 included in the neural consensus body proof module cluster to perform a random consensus body proof process according to an embodiment of the present disclosure.

In addition, the node terminal 100 is connected to the non-random consensus body blockchain network 200, and may include a blockchain service unit 120 for performing a shared propagation process of the next block configured by the random consensus body proof process through the non-random consensus body blockchain network 200.

Accordingly, in an embodiment of the present disclosure, the node terminals 100 may be node terminals 100 selected by a random consensus body selection process while participating in the non-random consensus body blockchain network 200, and selectively granted with the right to generate each block according to consensus of the consensus body, and through this, a random consensus body blockchain network system 1000 may be constructed independently.

In addition, as shown in FIG. 4, the node terminals 100 may selectively perform the functions of a fourth node terminal as a general node, a third node terminal as a participating node, a second node terminal as a congress node, or a first node terminal as a committee node.

The neural consensus body proof module cluster may be constructed based on the third node terminal, which is a terminal registered as a participating node. The participating node, which is the third node terminal, may verify participation qualifications on the basis of next consensus body selection information confirmed in the consensus validity verification data of a newly propagated block, and the second node terminal may be a terminal that processes the operation of the congress node function by confirming whether the congress node is selected according to a result of the verification. The first node terminal may be a terminal that processes the operation of the committee node function by confirming whether the committee node is selected according to a result of the verification.

The node terminal 100 selected as a congress node may perform a candidate block presentation and consensus process like the second node terminal shown in FIG. 4, and the node terminal 100 selected as a committee node may perform a process of determining a consensus block, collecting signature information, and configuring and distributing consensus body validity verification data of the next block. Here, the consensus body validity verification data may include consensus process verification data, multi-signature information, and next consensus body selection information, and the consensus body validity verification data may be propagated through a previously constructed non-random consensus body blockchain network 200.

According to the process of configuring and propagating a new block, the proof process of the existing non-random consensus body blockchain network 200 may be performed in a limited manner, and generation of a next block based on PoW or PoS proof between the node terminals 100 may be processed only in an exceptional case, in which the number of some nodes is smaller than a number set based on the Practical Byzantine Fault Tolerance (PBFT) reference value.

Meanwhile, the participation qualifications and verification information of the node terminal 100 may be calculated based on a random value calculated for each individual node according to registration of participating nodes, and mutually disclosed and verified, and a nonce chain may be used as described above to this end. For example, the node terminal 100 may be determined as at least one among a participating node, a congress node, a committee node, and a chairman node according to the qualification verification value of the node terminal 100 based on a hash process using the nonce value included in the next consensus body selection information, the height value of the current block, and the like.

In addition, as shown in FIG. 3, the node terminal 100 according to an embodiment of the present disclosure includes a device information setting unit 111, a node information setting unit 112, a validity verification processing unit 113, and a qualification verification processing unit 114, a consensus body node function unit 115, and a data interface unit 116.

The device information setting unit 111 acquires, stores, and manages device information of the terminal 100 in which the neural consensus body proof module 110 is installed. Here, the device information may include at least one among node name information, device address information, device performance information, device reliability information, and use network information of the terminal 100. This device information may be used to identify or construct a neural consensus body proof module cluster and perform a voting consensus process.

The node information setting unit 112 sets node information for registering the non-random consensus body blockchain network 200 and participating nodes. The set node information may include blockchain network client address information, and the terminal 100 may acquire or share block information by accessing the blockchain network through the blockchain network client address information.

The validity verification processing unit 113 acquires new block data propagated through the non-random consensus body blockchain network 200, extracts validity verification data from the new block data, and acquires neural consensus body designation information of the next block generated on the basis of the random consensus body proof process according to the verification process of the validity verification data.

In addition, the consensus body node function unit 115 is selectively driven based on the neural consensus body designation information of the next block to generate validity verification data for the next block, and may selectively drive at least one among a chairman node function unit 1151, a congress node function unit 1152, and a committee node function unit 1153. Although the chairman node function unit 1151 may be selectively driven by comparing the neural consensus body designation information with at least a portion of the nonce value of a designated node terminal 100, the present disclosure is not limited to this selection method.

First, the chairman node function unit 1151 may perform a chairman process corresponding to the congress and committee nodes, and may collect delegation information and participation qualification verification information of a valid transaction block, which are taken from the transaction pool of the blockchain network, and consensus body candidate information of the next block from the congress nodes. Accordingly, more than 3f+1 (f is a natural number) congress nodes may be selected and more than 2f+1 committee nodes may be selected for the next block.

In addition, the congress node function unit 1152 may transmit the delegation information and participation qualifications information of a valid transaction block taken from the transaction pool of the non-random consensus body blockchain network 200 to the node terminal 100 on which the chairman node function unit 1151 is driven.

In addition, the chairman node function unit 1151 may select a block that matches more than the consensus quorum of the congress nodes among the transaction blocks proposed by the congress node as a candidate block, and transmit a message requesting to perform a partial signature process on a multi-signature area indicating consensus on the candidate block to the node terminals 100 in which the committee node function unit 1153 is driven. For example, as the chairman node function unit 1151 may determine a transaction data candidate block that matches f+1 out of 2f+1 transaction data candidate blocks, and transmit a message requesting to perform a partial signature process on a multi-signature area to the committee node function unit 1153, the node terminal 100 in which the committee node function unit 1153 is driven may process a partial signature indicating a consensus corresponding to the candidate block and transmit the partial signature to the node terminal 100 in which the chairman node function unit 1151 is driven.

Accordingly, the chairman node function unit 1151 verifies the candidate block for which the multi-signature process is completed according to consensus of the committee and determines it as a distribution block, and generates validity verification data corresponding to the consensus process and generates a new block by combining the validity verification data with the distribution block.

The data interface unit 116 may convert the generated new block into the format of the non-random consensus body blockchain network 200 and transmit it to the blockchain service unit 120.

In addition, the blockchain service unit 120 may propagate the new block through the non-random consensus body blockchain network 200, and the new block may be propagated through the non-random consensus body blockchain network 200, and may also be added to the transaction data memory pool (mem pool) as a transaction data management unit 121 is driven.

Meanwhile, although not shown, the node terminal 100 device may include a memory that can be utilized by the blockchain service unit 120 and the neural consensus body proof module 110 described above. The memory may include instructions that can be read by a computer, and the blockchain service unit 120 and the neural consensus body proof module 110 may perform the operations described above as the instructions stored in the memory are executed on the processor. The memory may be volatile memory or non-volatile memory.

The memory may include a storage device to store data of a user. The storage device may be an embedded multimedia card (eMMC), solid state drive (SSD), universal flash storage (UFS), or the like. The storage device may include at least one non-volatile memory device. The non-volatile memory device may be NAND Flash Memory, Vertical NAND (VNAND) Flash Memory, NOR Flash Memory, Resistive Random Access Memory (RRAM), Phase Change Memory (PRAM), Magnetoresistive Random Access Memory (MRAM), Ferroelectric Random Access Memory (FRAM), Spin Transfer Torque Random Access Memory (STT-RAM), or the like.

FIG. 5 is a flowchart illustrating the operation method of the node terminal 100 according to an embodiment of the present disclosure.

Referring to FIG. 5, in the node terminal 100 according to an embodiment of the present disclosure, when new block data propagated through a previously constructed non-random consensus body blockchain network 200 is acquired (S101), the validity verification processing unit 113 extracts validity verification data from the new block data (S103) and acquires consensus designation information according to the validity verification process of the validity verification data (S105).

The validity verification processing unit 113 may acquire neural consensus body designation information of the next block generated on the basis of the random consensus body proof process according to the verification process of the validity verification data, and as described above, the validity verification data may include consensus process verification data corresponding to the random consensus body proof process.

For example, the consensus process verification data is membership qualification verification information of a congress node that processes consensus on transaction data, and may include nonce chain-based qualification proof hash data and multi-signature data formed by combining partial signatures of the congress node. In addition, the neural consensus body designation information of the next block may include nonce information for verifying participation qualifications of a neural consensus body corresponding to the next block.

Thereafter, the node terminal 100 determines whether a node is selected as a node constituting a neural consensus body proof cluster node of the next block (S107), and confirms whether it is a chairman node on the basis of the consensus designation information when a node is selected (S109).

When it is not designated as a chairman node, the node terminal 100 may transmit delegation information and participation qualification verification information of a valid transaction block taken from the transaction pool of the blockchain network to the congress chairman node according to each qualification (S113).

Accordingly, the node terminal 100, in which the chairman node function unit 1151 is driven, may collect delegation information and consensus body candidate information of the next block from other nodes (S115).

In addition, the node terminal 100, in which the chairman node function unit 1151 is driven, determines a candidate block agreed by the node terminal 100, in which the congress node function unit 1152 is driven, and transmits a message requesting to perform a partial signature process on a multi-signature area indicating consensus on the candidate block to a committee member node (S117).

In addition, the node terminal 100, in which the chairman node function unit 1151 is driven, verifies the candidate block for which the multi-signature process is completed according to consensus of the committee and determines the candidate block as a distribution block (S119), generates a new block by generating validity verification data and combining the validity verification data with the distribution block (S121), registers the combined new block in the transaction pool of the non-random consensus body blockchain network 200 and propagates the new block through a previously constructed non-random consensus body blockchain network 200 (S123).

FIGS. 6 to 9 are views exemplarily showing step-by-step data processed by a consensus body proof module node device according to an embodiment of the present disclosure.

Figure 6:
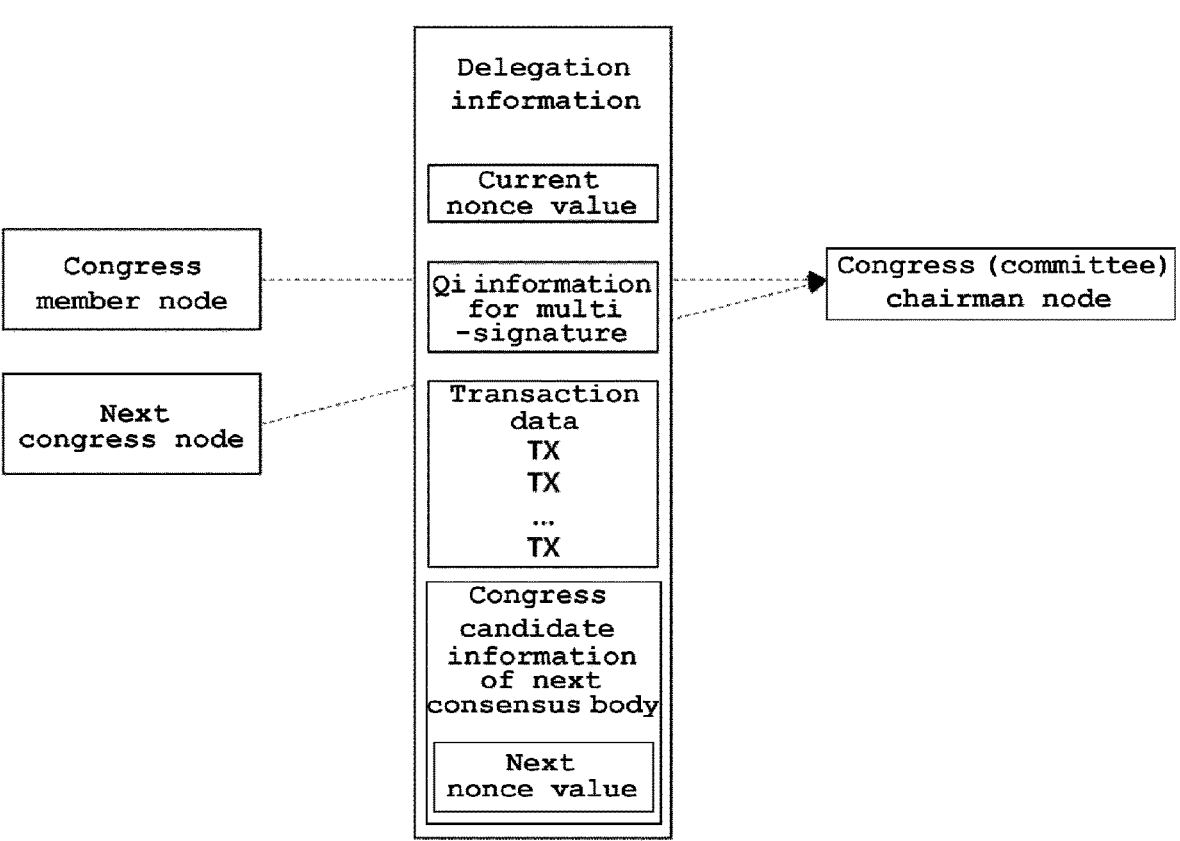
FIGS. 6 to 9 are views exemplarily showing step-by-step data processed by a consensus body proof module node device according to an embodiment of the present disclosure.

FIG. 6 is a view showing an example of delegation information transmitted to the chairman node at the delegation request step for configuring the current block, and the delegation information may include a nonce value corresponding to the height of the current block, Qi value information that each congress node desires to use for multi-signature, transaction data, congress candidate information of the next consensus body, and the nonce value of the height of the next block.

Figure 7:
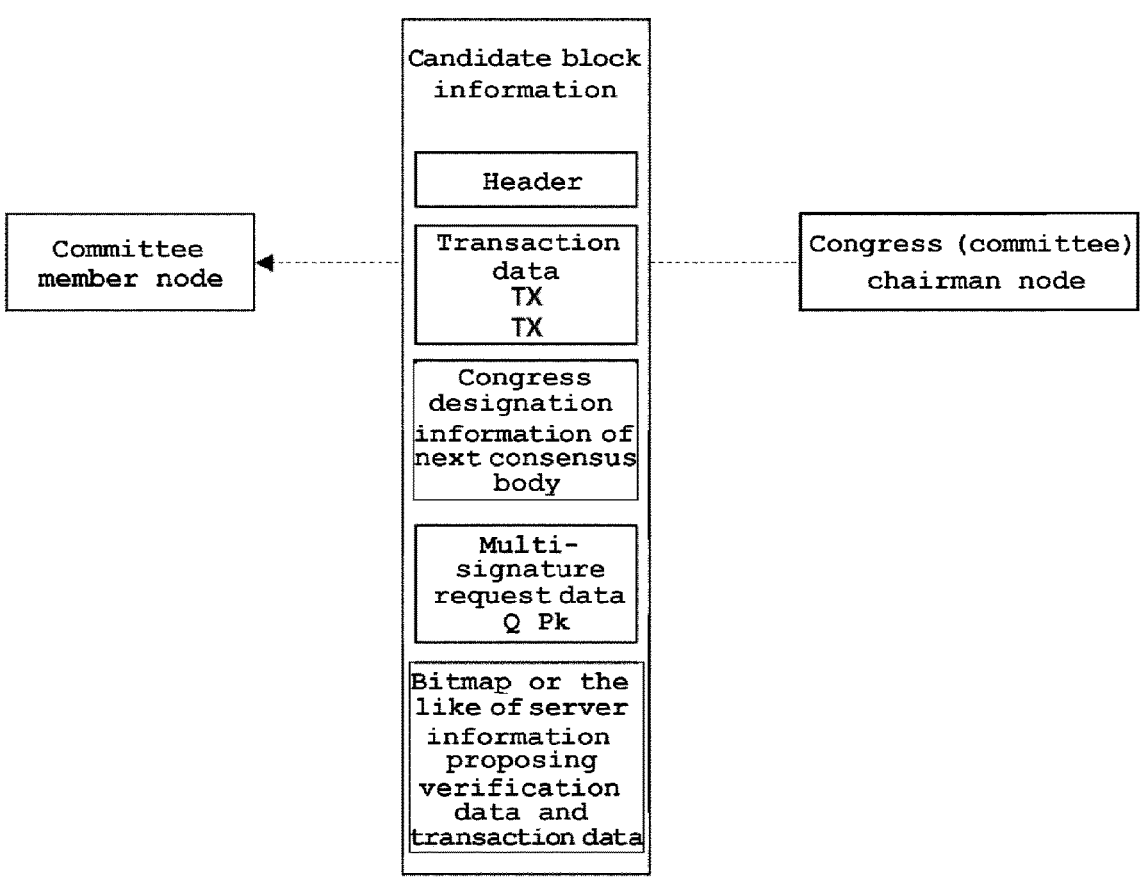

FIG. 7 is a view showing an example of candidate block information transmitted from the chairman node to the committee node at the preparation step, and the candidate block information may include header information including MerkleRoot or the like, candidate block transaction data, congress designation information of the next consensus body, multi-signature request data (Q data integrating Qi, public key Pk), and verification data. The verification data may be, for example, bitmap information or the like that can identify information on the server that has proposed transaction data, and this may prevent the cases or the like proposed by the chairman node itself.

Figure 8:
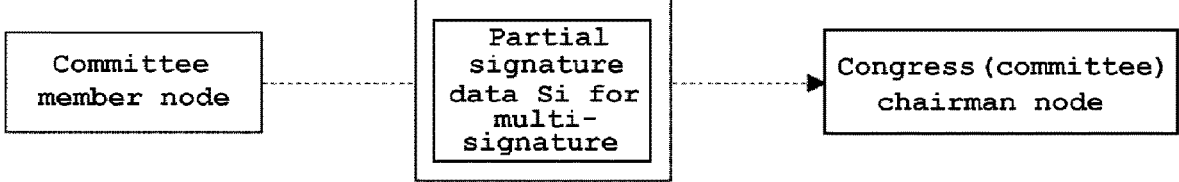

In addition, FIG. 8 is a view showing an example of partial signature data propagated from the committee node to the chairman node in a process in which committee verification is processed, and the chairman node may calculate signature completion data S by integrating partial signature data Si.

Figure 9:
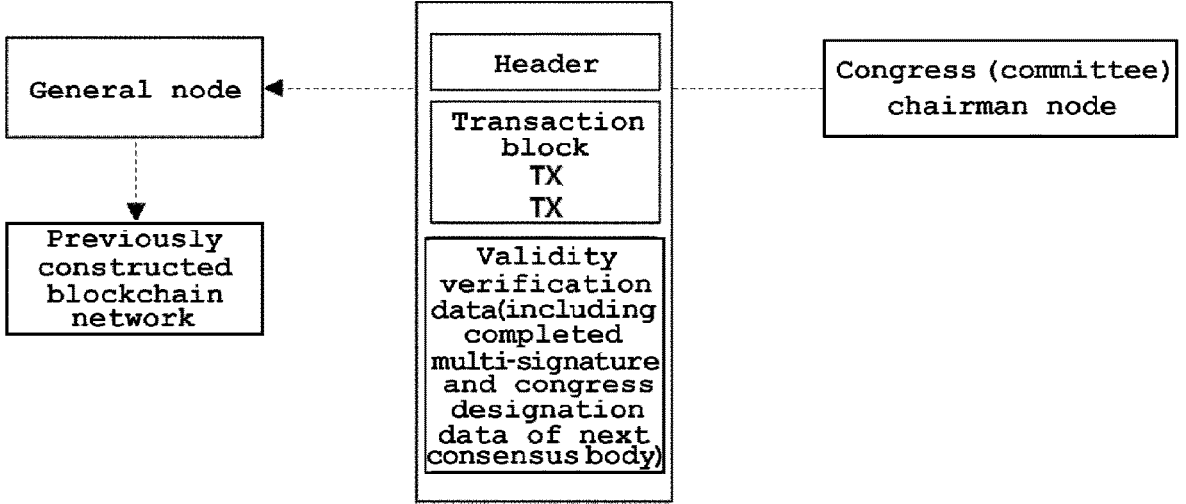

Meanwhile, FIG. 9 is a view showing the configuration of a new block generated and propagated according to an embodiment of the present disclosure, and the new block may include header information, transaction block information, and validity verification data. As described above, the validity verification data may include designation information of the next consensus body, completed multi-signature information, and various information that can prove the consensus process and participation qualifications. In addition, the header information may also include a MerkleRoot value for validity verification of the block data itself.

Accordingly, the validity verification processing unit 113 may primarily verify the consensus process by confirming the multi-signature information first, and secondarily verify the consensus process by confirming whether the Merkle-Root value of the header is normal, and make it possible to safely process transaction blocks through tertiary verification by comparing the blocks with a MerkleRoot value calculated again using the transaction block information.

FIG. 10 is a flowchart illustrating the operation method of a node terminal device according to another embodiment of the present disclosure.

Referring to FIG. 10, the node terminal 100 according to another embodiment of the present disclosure first identifies the number of congress and committee nodes of the next neural consensus body (S201).

In addition, the node terminal 100 determines whether a preset quorum of consensus body is not satisfied according to the minimum number of Practical Byzantine Fault Tolerance nodes.

For example, the quorum of consensus body may be determined by the maximum Byzantine number (maximum number of allowed malicious nodes) that can be selected by the node selection probability P in correspondence to the number of participating nodes N, and the number of congress nodes should be at least 3f+1 (f is a natural number) and the number of committee nodes should be at least 2f+1 to satisfy the quorum of consensus body.

When the number of consensus body nodes is smaller than the quorums of the congress and the committee of the neural consensus body set in advance according to the minimum number of Practical Byzantine Fault Tolerance nodes, the node terminal 100 performs a selective exception process of forming the validity verification data of the next block in a Proof of Work (PoW) or Proof of Stake (Pos) method (S205).

On the contrary, when the number of consensus body nodes is larger than or equal to the quorums of the congress and the committee of the neural consensus body set in advance according to the minimum number of Practical Byzantine Fault Tolerance nodes, the node terminal 100 may limit the PoW (Proof of Work) or POS (Proof of Stake) process of the non-random consensus body proof-based blockchain network, configure a neural consensus body using the process of FIG. 5 described above, and configure validity verification data and generate and propagate a new block (S203).

Figure 11:
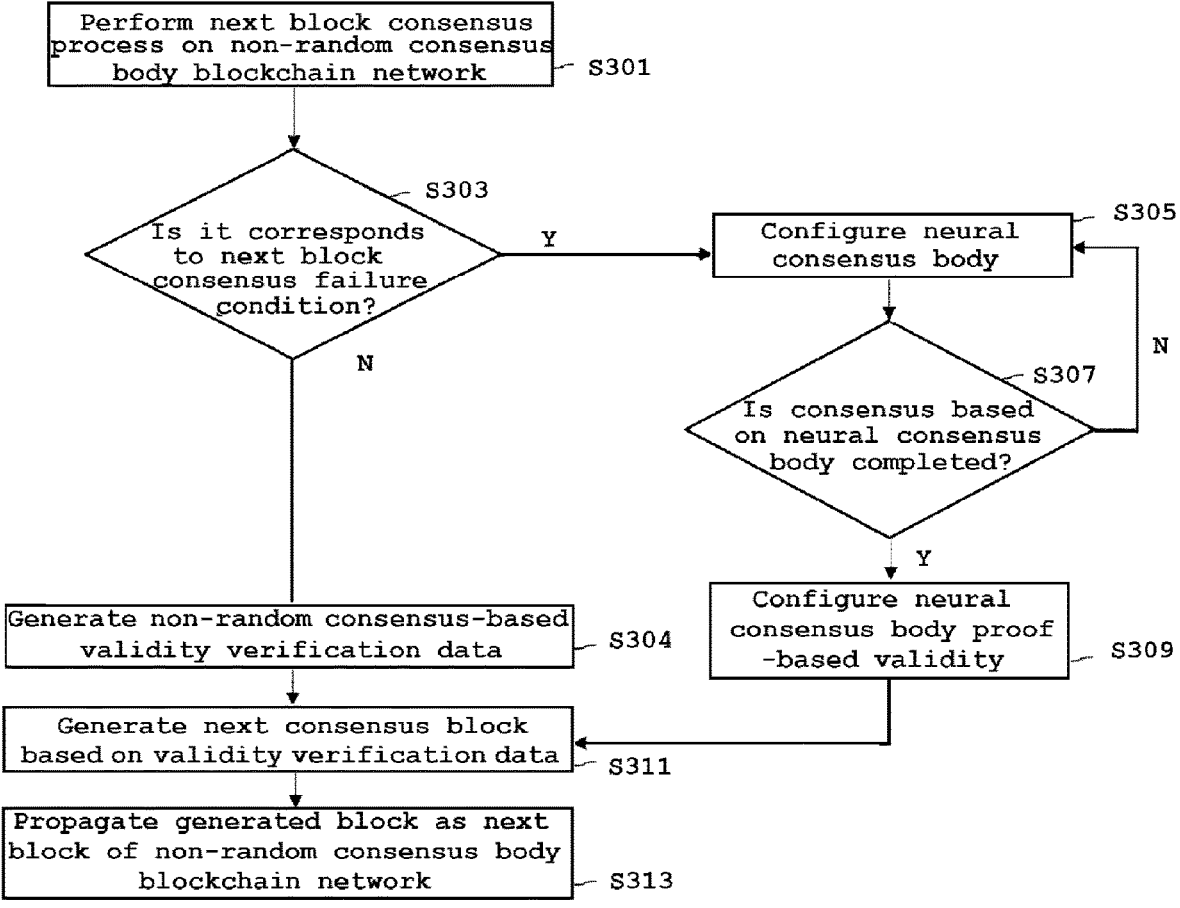
FIG. 11 is a flowchart illustrating the operation method of a node terminal device according to another embodiment of the present disclosure.

FIG. 11 is a flowchart illustrating the operation method of a node terminal device according to another embodiment of the present disclosure.

Referring to FIG. 11, the processes for identifying or constructing a neural consensus body proof module cluster and performing a voting consensus process according to another embodiment of the present disclosure may be used to quickly generate a next block to guarantee continuity when a failure occurs in the non-random consensus body blockchain network 200.

Generally, in the case of a non-random consensus method of Proof of Work or Proof of Stake such as Ethereum or the like, problems such as timeout of the block generation cycle due to abnormal service driving or overload, unstable consensus due to duplicated transactions, and the like occur. As a result, the current non-random consensus body blockchain network 200 may not sufficiently guarantee continuity of block generation and is vulnerable in dealing with failures in the sense that, for example, a hard fork or the like occurs due to temporarily service interruption, payment delay, transaction failure, or the like.

Accordingly, the processes for identifying or constructing a neural consensus body proof module cluster and performing a voting consensus process according to an embodiment of the present disclosure may also be complementarily performed in a way of guaranteeing continuity when a failure occurs in driving the existing non-random consensus body blockchain network 200.

This can be implemented by setting one or more of the node terminals constituting the existing non-random consensus body blockchain network 200 to operate as the node device 100 constituting the neural consensus body proof module cluster described above when a preset failure condition occurs even without construction of a separate infrastructure.

More specifically, referring to FIG. 11, the node terminal 100 according to an embodiment of the present disclosure may be a node terminal constituting the non-random consensus body blockchain network 200, and may operate, when it corresponds to the next block consensus failure condition, as a node device 100 constituting a neural consensus body proof module cluster to be configured as a terminal that configures validity verification data based on the neural consensus body and propagate the validity verification data to the next block.

To configured the terminal like this, the node terminal 100 may operate as the node device 100 constituting a preset neural consensus body proof module cluster, and may be driven in a continuity guarantee mode to guarantee continuity unlike switching the existing blockchain described above.

For example, as described above, the node terminal 100 may be driven in any one among a network switching mode of switching an existing non-random consensus body blockchain network 200 to a random consensus body blockchain network and a continuity guarantee mode subsidiarily driven when a failure occurs in the existing non-random consensus body blockchain network 200, and FIG. 11 explains the operation when the node terminal 100 is driven in the continuity guarantee mode.

First, the node terminal 100 performs a next block consensus process on a general non-random consensus body blockchain network 200 (S301).

Then, the node terminal 100 determines whether it corresponds to a next block consensus failure condition (S303).

Here, various conditions may be set in advance as the next block consensus failure condition, and preferably, a timeout condition of not generating a block during a first time may be used. For example, the first time may be the same as a second time, which is a time of timeout specified in the Proof of Work or Proof of Stake process of the non-random consensus body blockchain network 200.

In addition, in order to minimize transaction delay and take into account the speed of work, the first time may be set to be shorter than the second time so that configuration of the neural consensus body proof module cluster may be processed before the timeout of the non-random consensus body blockchain network 200.

In addition, the next block consensus failure condition may be, for example, a temporarily service interruption or the like. For example, it may be set to continuously perform an auxiliary block generation process according to configuration of a neural consensus body proof module cluster when the service of the non-random consensus body blockchain network 200 is temporarily interrupted due to transaction delay, transaction failure, hard fork, or other temporary service operation problems.

When it does not correspond to the next block consensus failure condition, non-random consensus-based validity verification data is generated on the non-random consensus body blockchain network 200 in a method of normal Proof of Work or Proof of Stake (S304).

In addition, when it corresponds to the next block consensus failure condition, the node terminal 100 described above may be driven as a node device 100 constituting the neural consensus body proof module cluster, and performs a process of configuring a neural consensus body proof module cluster of a random method described in FIGS. 4 and 5, and a consensus process based thereon (S305).

When the consensus based on the neural consensus body proof module cluster is completed (S307), the node terminal 100 configures neural consensus body proof-based validity verification data, and verifies data validity between the previous block and the next block configured in the non-random consensus body blockchain network 200 on the basis of the configured validity verification data (S309).

Here, specific block height information, previous block information, and next block information may be used to verify validity of data between the previous block and the next block, and generation of a block of a non-random consensus format that can be used in the non-random consensus body blockchain network 200 may be performed through verification of validity based thereon.

Thereafter, the node terminal 100 generates a next consensus block based on the non-random consensus-based validity verification data at step S304 or the neural consensus body proof-based validity verification data verified at step S309 (S311).

For example, the node terminal 100 may generate a next block including the neural consensus body proof-based validity verification data and generate the next block of a non-random consensus format verified according to step S309. More specifically, when the latest block height is 100 currently, the node terminal 100 may generate a next block that starts again the consensus on the non-random consensus body blockchain network 200 from a block with a height of 110.

Then, the node terminal 100 propagates the generated block as the next block of the non-random consensus body blockchain network 200 (S313).

As a neural consensus body proof-based block generation process, which is subsidiarily driven when a failure occurs in the non-random consensus body blockchain network 200 of a Proof of Work or Proof of Stake method of Ethereum, Bitcoin, or the like, is performed according to the process of the node terminal 100, continuity of service can be sufficiently guaranteed.

Meanwhile, various embodiments described herein may be implemented, for example, in a computer-readable recording medium using software, hardware, or a combination thereof. According to hardware implementation, the embodiments described herein may be implemented using at least one among application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing functions. In some cases, such embodiments may be implemented by a control unit.

In addition, the embodiments described above may be implemented in hardware components, software components, and/or combinations of hardware components and software components. For example, the devices, methods, and components described in the embodiments may be implemented using one or more general-purpose or special-purpose computers, such as a processor, controller, central processing unit (CPU), graphics processing unit (GPU), arithmetic logic unit (ALU), digital signal processor, microcomputer, field programmable gate array (FPGA), programmable logic unit (PLU), microprocessor, application specific integrated circuits (ASICs), or any other devices capable of executing instructions and responding thereto.

In addition, the methods according to an embodiment of the present disclosure described above can be produced as a program to be executed on a computer. In addition, the program may be stored in a computer-readable recording medium, and examples of the computer-readable recording media may include ROM, RAM, CD-ROM, magnetic tape, floppy disk, and optical data storage devices, and the like.

The computer-readable recording medium may be distributed in computer systems connected through a network, so that computer-readable codes may be stored and executed in a distributed manner. In addition, functional programs, codes, and code segments for implementing the method may be easily inferred by the programmers in the art to which the present disclosure belongs.

In addition, although preferred embodiments of the present disclosure have been illustrated and described above, the present disclosure is not limited to the specific embodiments described above, and various modified embodiments can be made by those skilled in the art without departing from the gist of the disclosure claimed in the claims, and in addition, these modified embodiments should not be individually understood from the spirit or perspective of the present disclosure.

The invention claimed is:

1. An operation method of a node device connected to a blockchain network utilizing a Proof of Work (PoW) method, the operation method comprising:

acquiring block data newly propagated through the blockchain network;

detecting a consensus failure condition of the PoW method, the consensus failure condition including a next block not being generated within a predetermined time period that is shorter than a timeout period specified in the PoW method; and generating a next block corresponding to the block data using a neural consensus body proof-based block generation (NCBG) process according to the consensus failure condition, the text block generated by the NCBG process having a block height at which the PoW method restarts, the block height being a non-consecutive value relative to a latest block height, wherein the NCBG process includes:

extracting first validity verification data from the block data;

acquiring neural consensus body designation information (NCDI) of the next block generated on the basis of a random consensus body proof process (RCPP) according to a verification process of the first validity verification data; and generating second validity verification data of the next block by selectively performing function units of the je device on the basis of the NCDI of the next block, wherein the first validity verification data includes consensus process verification data (CPVD) corresponding to the RCPP, wherein the next block is generated in a format usable in the blockchain network utilizing the PoW method.

2. The method according to claim 1, wherein the NCBG process further includes:

propagating the next block through the blockchain network.

3. The method according to claim 1, wherein the CPVD includes membership verification information of a congress node that processes consensus on transaction data, and a partial signature generated by the congress node for use in multi-signature data.

4. The method according to claim 1, wherein the NCDI of the next block includes nonce information for verifying participation qualifications of a neural consensus body corresponding to the next block.

5. The method according to claim 1, wherein the next block is generated by combining the second validity verification data and a distribution block determined based on a transaction block included in the block data, wherein the NCBG process further includes propagating the next block through the blockchain network.

6. A node device connected to a blockchain network utilizing a Proof of Work (PoW) method, the node device comprising:

a hardware component including at least one of a central processing unit (CPU), a graphics processing unit (GPU), an arithmetic logic unit (ALU), a digital signal processor (DSP), a field-programmable gate array (FPGA), or an application-specific integrated circuit (ASIC); and a memory storing instructions, wherein the instructions, when executed by the hardware component, cause the node device to perform operations comprising:

acquiring block data newly propagated through the blockchain network;

detecting a consensus failure condition of the PoW method, the consensus failure condition including a next block not being generated within a predetermined time period that is shorter than a timeout period specified in the PoW method; and generating a next block corresponding to the block data using a neural consensus body proof-based block generation (NCBG) process according to the consensus failure condition, the next block generated by the NCBG process having a block height at which the PoW method restarts, the block height being a non-consecutive value relative to a latest block height, wherein the NCBG process includes:

extracting first validity verification data from the block data;

acquiring neural consensus body designation information (NCDI) of the next block generated on the bases of a random consensus body proof process (RCPP) according to a verification process of the first validity verification data; and generating second validity verification data of the next block by selectively performing function units of the node device on the basis of the NCDI of the next block, wherein the first validity verification data includes consensus process verification data (CPVD) corresponding to the RCPP, wherein the next block is generated in a format usable in the blockchain network utilizing the PoW method.

7. The device according to claim 6, wherein the instructions, when executed by the are component, cause the node device to further perform: propagating the next block through the blockchain network.

8. The device according to claim 6, wherein the CPVD includes membership verification information of a congress node that processes consensus on transaction data, and a partial signature generated by the congress node for use in multi-signature data.

9. The device according to claim 6, wherein the NCDI of the next block includes nonce information for verifying participation qualifications of a neural consensus body corresponding to the next block.

10. The device according to claim 6, wherein the next block is generated by combining the second validity verification data and a distribution block determined based on a transaction block included in the block data, wherein the NCBG process further includes propagating the next block through the blockchain network.

11. A blockchain network system comprising:

a neural consensus body proof module (NCPM) cluster comprising node devices, the node devices each including:

a hardware component including at least one of a central processing unit (CPU), a graphics processing unit (GPU), a arithmetic logic unit (ALU), a digital signal processor (DSP), a field-programmable gate array (FPGA), or an application-specific integrated circuit (ASIC); and a memory storing instructions, wherein the instructions, when executed by the hardware component, cause a respective node device of the node devices to perform operations comprising:

acquiring block data newly propagated through the blockchain network;

detecting a consensus failure condition of the PoW method, the consensus failure condition including a next block not being generated within a predetermined time period that is shorter than a timeout period specified in the PoW method; and generating a next block corresponding to the block data using a neural consensus body proof-based block generation (NCBG) process according to the consensus failure condition, the next block generated by the NCBG process having a block height at which the PoW method restarts, the block height being a non-consecutive value relative to a latest block height, wherein the NCBG process includes:

extracting first validity verification data from the block data;

acquiring neural consensus body designation information (NCDI) of the next block generated on the basis of a random consensus body proof process (RCPP) according to a verification process of the first validity verification data; and generating second validity verification data of the next block by selectively performing function units of the node device on the basis of the NCDI of the next block, wherein the first validity verification data includes consensus process verification data (CPVD) corresponding the RCPP, wherein the next block is generated in a format usable in the blockchain network utilizing the POW method.

* * * * *